United States Patent
Pisek

(10) Patent No.: US 7,991,984 B2
(45) Date of Patent: Aug. 2, 2011

(54) SYSTEM AND METHOD FOR EXECUTING LOOPS IN A PROCESSOR

(75) Inventor: Eran Pisek, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 11/317,361

(22) Filed: Dec. 23, 2005

(65) Prior Publication Data

US 2006/0182135 A1 Aug. 17, 2006

Related U.S. Application Data

(60) Provisional application No. 60/653,968, filed on Feb. 17, 2005, provisional application No. 60/682,339, filed on May 18, 2005, provisional application No. 60/730,232, filed on Oct. 25, 2005.

(51) Int. Cl.
    G06F 7/38      (2006.01)
    G06F 9/00      (2006.01)
    G06F 9/44      (2006.01)
(52) U.S. Cl. .............................................. 712/241
(58) Field of Classification Search .................... 712/241
    See application file for complete search history.

(56) References Cited

U.S. PATENT DOCUMENTS

| 4,097,920 | A | | 6/1978 | Ozga |
| 4,652,997 | A | | 3/1987 | Kloker |
| 5,375,238 | A | * | 12/1994 | Ooi ............................ 712/241 |
| 5,710,913 | A | | 1/1998 | Gupta et al. |
| 5,887,179 | A | * | 3/1999 | Halahmi et al. ............. 713/324 |
| 6,092,045 | A | * | 7/2000 | Stubley et al. ............... 704/254 |
| 6,145,076 | A | * | 11/2000 | Gabzdyl et al. .............. 712/241 |
| 6,842,895 | B2 | * | 1/2005 | Renard et al. ................ 717/160 |
| 7,380,112 | B2 | * | 5/2008 | Okabayashi et al. ......... 712/241 |
| 2002/0056033 | A1 | * | 5/2002 | Huppenthal ................... 712/15 |
| 2007/0055851 | A1 | * | 3/2007 | Leijten ......................... 712/228 |

OTHER PUBLICATIONS

Singh et al., Interconnect Pipelining in a Throughput-Intensive FPGA Architecture, Feb. 2001, pp. 153-160.*

* cited by examiner

*Primary Examiner* — Eddie Chan
*Assistant Examiner* — George D Giroux

(57) ABSTRACT

A loop control system comprises at least one loop flag in an instruction word, at least one loop counter associated with the at least one loop flag operable to store and compute a number of times a program loop is to be executed, at least one start address register associated with the at least one loop flag operable to store a program loop starting address, and at least one end address register associated with the at least one loop flag operable to store a program loop ending address.

20 Claims, 5 Drawing Sheets

SYSTEM AND METHOD FOR EXECUTING LOOPS IN A PROCESSOR

RELATED APPLICATIONS

This application claims the benefit of U.S. Provisional Patent No. 60/653,968 filed on Feb. 17, 2005 and entitled "Context-Based Operation Reconfigurable Instruction Set Processor," Provisional Patent Application No. 60/682,339 filed on May 18, 2005 and entitled "Viterbi Decoder Architecture For Software-Defined Radio," and Provisional Patent Application No. 60/730,232 filed on Oct. 25, 2005 and entitled "System and Method for Executing Loops in a Processor," all of which are hereby incorporated herein by reference.

BACKGROUND

Conventional microprocessors and digital signal processors require the use of specialized instructions and hardware to execute loops and nested loops in program execution. For example, specialized instructions may require additional fields to specify the number of iterations to execute a loop. Further, specialized registers are required to specify the start address and end address of each loop. In VLIW (very large instruction width) processors, special execution units need to be provided to indicate the number of loop iterations or the location of the pointer to an address location that stores the number of loops as well as the start and end address locations.

In certain applications such as mobile telephones where the quest for reductions in energy consumption and size is ongoing and never satisfied, these additional overhead requirements for program loop execution have become undesirable.

SUMMARY

In one aspect of the disclosure, a loop control system comprises at least one loop flag in an instruction word, at least one loop counter associated with the at least one loop flag operable to store and compute a number of times a program loop is to be executed, at least one start address register associated with the at least one loop flag operable to store a program loop starting address, and at least one end address register associated with the at least one loop flag operable to store a program loop ending address.

In another aspect of the disclosure, a loop control method comprises reading an instruction and determining whether a loop flag is set indicative of a beginning of a program loop, storing an address of the instruction in a start address register in response to the loop flag being set, setting a loop counter to a predetermined iteration number, reading and executing instructions in the program loop until the loop flag is again set to indicate an ending of the program loop, storing an address of the instruction in an end address register in response to the loop flag being set, and repeatedly executing instructions between the addresses stored in the start and end address registers for the number of iterations stored in the loop counter.

In another aspect of the disclosure, a reconfigurable processor system comprises an interconnect fabric, and a plurality of context-based reconfigurable processors coupled to the interconnect fabric. Each context-based reconfigurable processors comprises at least one loop flag in an instruction word, at least one loop counter associated with the at least one loop flag operable to store and compute a number of times a program loop is to be executed, at least one start address register associated with the at least one loop flag operable to store a program loop starting address, and at least one end address register associated with the at least one loop flag operable to store a program loop ending address.

In another aspect of the disclosure, a wireless communication device comprises a broadband modem, which comprises an interconnect fabric, and a plurality of context-based reconfigurable processors coupled to the interconnect fabric. Each context-based reconfigurable processors comprises at least one loop flag in an instruction word, at least one loop counter associated with the at least one loop flag operable to store and compute a number of times a program loop is to be executed, at least one start address register associated with the at least one loop flag operable to store a program loop starting address, and at least one end address register associated with the at least one loop flag operable to store a program loop ending address.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
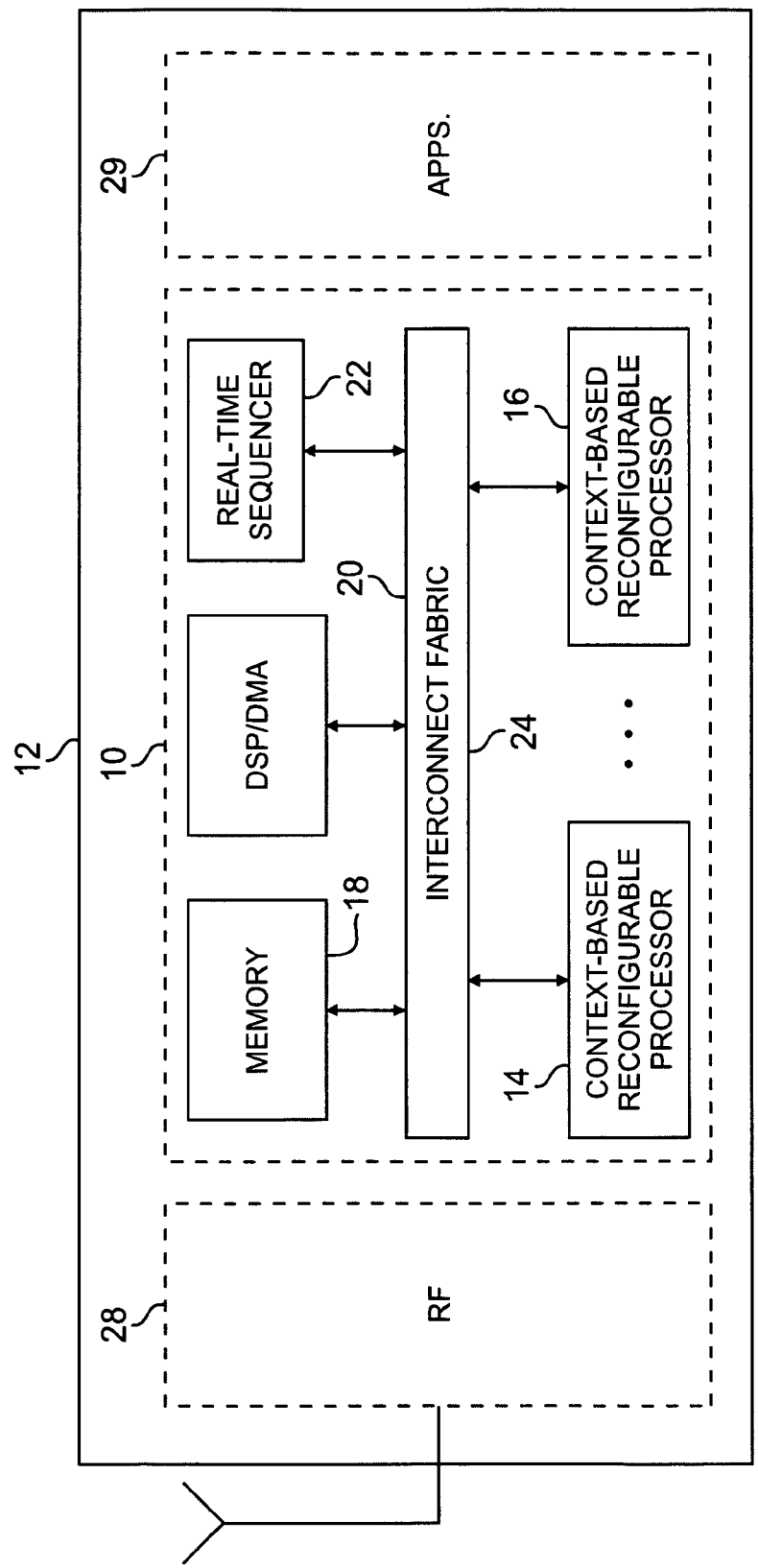
FIG. 1 is a simplified block diagram of an embodiment of a reconfigurable processing system having a plurality of context-based reconfigurable processors.

FIG. 1 is a simplified block diagram of an embodiment of a reconfigurable processing system 10 having a plurality of context-based reconfigurable processors 12. Reconfigurable processing system 10 is a software-defined radio (SDR) that comprises N context-based reconfigurable processors 13-14. Context-based reconfigurable processors 14-16 are interconnected and coupled to a memory 18, a digital signal processor (DSP) and/or direct memory access (DMA) module(s) 20, and a real-time sequencer 22 via an interconnect fabric 24. Each context-based reconfigurable processors 14-16 may be a specialized processor operable to focus on a particular signal processing task. For example, one context-based reconfigurable processor may be a Viterbi processor that is optimized to perform Viterbi decoding operations. Another context-based reconfigurable processor may be a correlator processor that is optimized to perform correlation processes. Yet another context-based reconfigurable processor may be a turbo code decoder that is optimized to perform forward error correction decoding.

Context-based reconfigurable processors each includes generic hardware modules that execute context-related instructions in an optimized manner. Each context-based reconfigurable processor operate independently of one another under the scheduling and control of real-time sequencer 22. One or more context-based reconfigurable processors may be independently inactivated or shut-down in applications that do not require them to optimize power consumption. Interconnect fabric 24 is reconfigurable and provides connectivity between the components in reconfigurable processing system 10. Each context-based reconfigurable processor may act as a master of interconnect fabric 24 and may initiate access to memory 18.

Reconfigurable processing system 10 may be used to implement a broadband modem of a mobile phone or similar wireless communications device 26. Device 26 additionally comprises an RF (radio frequency) section 28 and a plurality of applications 29 to carry out specialized functions. Because the technology and standards for wireless communications is a continuously moving target, fixed hardware architecture for mobile phones become outdated very quickly. Therefore, a software-defined context-based reconfigurable system such as system 10 can adapt to different technologies and standards now known and later to be developed.

Figure 2:
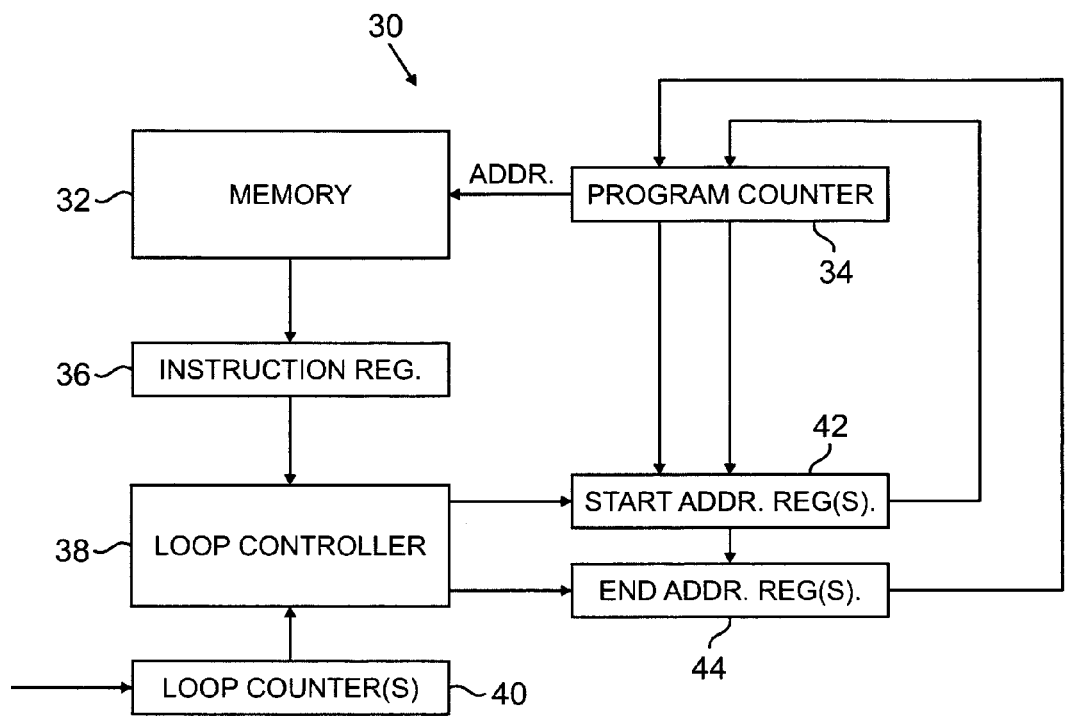
FIG. 2 is a simplified block diagram of an embodiment of a loop control system and method in one of the plurality of context-based reconfigurable processors.
Figure 4:
FIG. 4 is a simplified instruction word format with a loop control flag.

FIG. 2 is a simplified block diagram of an embodiment of a loop control system and method 30 in one of the plurality of context-based reconfigurable processors. A memory 32 (not the same as memory 18 in FIG. 1) is operable to store a plurality of program instructions. These instructions may be context-related instructions that are associated with a particular function of a context-based reconfigurable processors. For example, the stored instructions may be operable to perform Viterbi decoding operations that support different existing and future wireless applications such as GSM (Global System for Mobile communication), EDGE (Enhanced Data for Global Evolution), 802.xx, W-CDMA (wide-band Code-Division Multiple Access), HSDPA (High Speed Downlink Packet Access), and CDMA2000 standards, for example. The Viterbi decoding algorithm is known to those skilled in the art of digital signal processing. A program counter 34 is operable to point to or store the address of the next program instruction to be executed. An instruction register 36 is operable to hold the instruction word fetched from memory 32 that is to be executed. A loop controller 38 is operable to control the execution of loops and nested loops. A loop counter 40 is operable to maintain the number of iterations the loop is to be executed and provide this information to loop controller 38. Loop counter 40 may receive the loop iteration count from a processor host (not shown) of the context-based reconfigurable processor. A start address register 42 and an end address register 44 are operable to store the start of the loop and the end of the loop addresses, respectively. The operations of these blocks are described in more detail below with reference to FIGS. 3 and 4.

Figure 3:
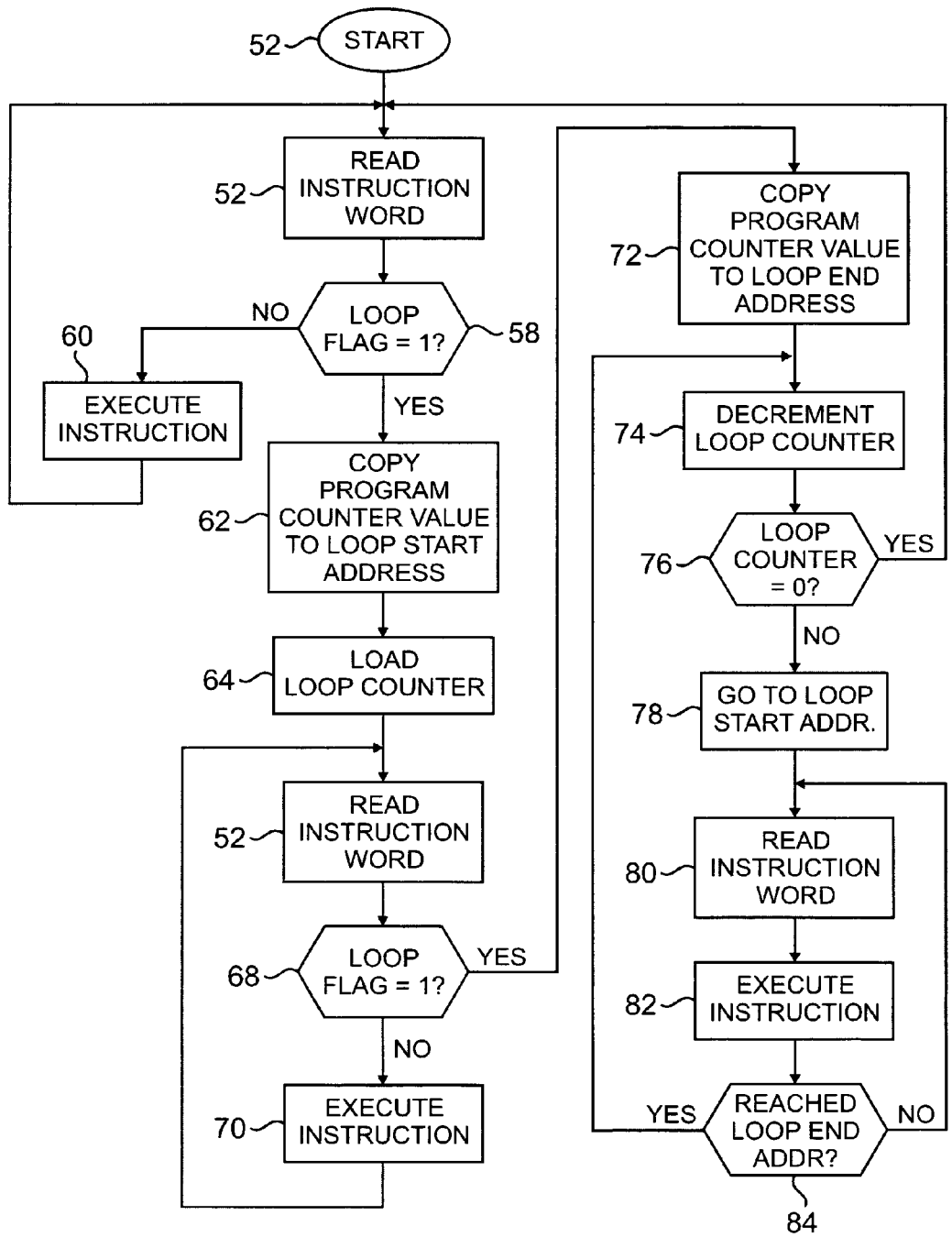
FIG. 3 is a simplified flowchart of an embodiment of a loop control method.

FIG. 3 is a simplified flowchart of an embodiment of a loop control method 50. In step 52, the instruction word stored in memory 32 pointed to by program counter 34 is read into instruction register 36. A loop flag 54 of an instruction word 56 is examined to determine if the instruction is indicative of the beginning of a program loop. Loop flag 54 may be a toggle bit that is set to "1" if the instruction is the beginning or end of the loop, and is set to "0" otherwise. If loop flag is not a "1," as determined in step 58, then the loaded instruction is simply executed in step 60. If however the loop flag is a "1," then it is the first occurrence of the loop flag being set and it marks the beginning of the loop.

In step 62, the program counter value, which points to the beginning of the loop, is copied to start address register 42. In step 64, loop counter 40 is loaded an iteration value by the processor host, for example. In a context-based reconfigurable processor configured to perform Viterbi decoding operations, for example, loop counter 40 is loaded with a Viterbi block size. In step 66, the program counter advances to the address of the next instruction, and the next instruction word is loaded into the instruction register. If the loop flag of this instruction is not a "1," as determined in step 68, then the instruction is executed in step 70 and execution proceeds to step 66 to read the next instruction. If in step 68 it is determine that the loop flag is a "1," then because it is the second occurrence of the flag, it is indicative of the end of the loop. In step 72, the program counter value is copied to end address register 44. The loop counter value is decremented by one in step 74 since one iteration of the loop has been executed. In step 76, the loop counter value is examined to determine if it has reached zero. If the loop counter value is zero, then all iterations of the loop execution has been performed and the execution proceeds to step 52. If the loop counter count has not yet reached zero, then execution loops back to the beginning of the loop by copying the loop start address from start address register 42 to program counter 34 in step 78. The instruction pointed to by the start address in the program counter is then loaded to instruction register 36 in step 80, and the instruction is executed in step 82. In step 84, a determination is made as to whether the end of the loop has been reached by comparing the program counter value to the end address value in end address register 44. If not, then the execution returns to step 80 to continue to execute instructions inside the loop. If the end of the loop has been reached then execution proceeds to step 74 to decrement the loop counter and then make a determination as to whether all the loop iterations has been executed in step 76. These steps are executed until the loop has been executed according to the correct number of times first loaded into the loop counter in step 64.

Figure 5:
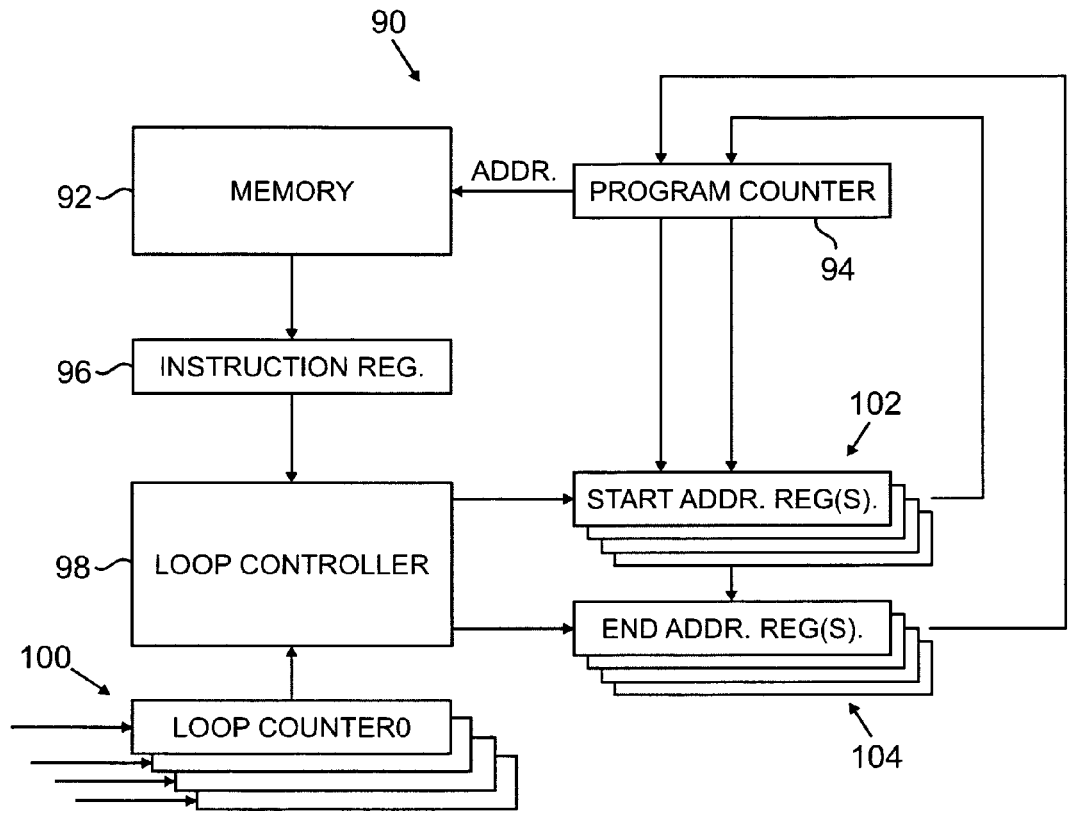
FIG. 5 is a simplified block diagram of an embodiment of a nested loop control system and method in one of the plurality of context-based reconfigurable processors.
Figure 7:
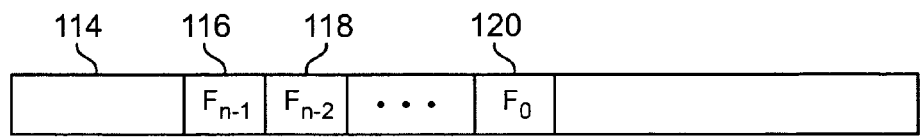
FIG. 7 is a simplified instruction word format with a nested loop control flag.

FIG. 5 is a simplified block diagram of an embodiment of a nested loop control system and method 90 in one of the plurality of context-based reconfigurable processors. Nested loops describe the situation where one loop is contained within an outer loop. There may be a plurality of loops nested inside one another in a program execution. A memory 92 is operable to store a plurality of program instructions. A program counter 94 is operable to point to or store the address of the next program instruction to be executed. An instruction register 96 is operable to hold the instruction word read from memory 92 that is to be executed. A loop controller 98 is operable to control the execution of program loops and nested program loops. A plurality of loop counters 100 is each operable to maintain the number of iterations a loop is to be executed and provide this information to loop controller 98. Loop counters 100 may receive the loop iteration counts from a processor host (not shown) of the context-based reconfigurable processor. A plurality of start address registers 102 and end address registers 104 are operable to store the start and end of the program loops. Therefore, each program loop is associated with a loop counter and a pair of start and end address registers. Referring also to FIG. 7, each program loop is also associated with its own loop flag, $F_{n-1}, F_{n-2}, \ldots F_0$. The operations of these blocks are described in more detail below with reference to FIGS. 6 and 7.

Figure 6:
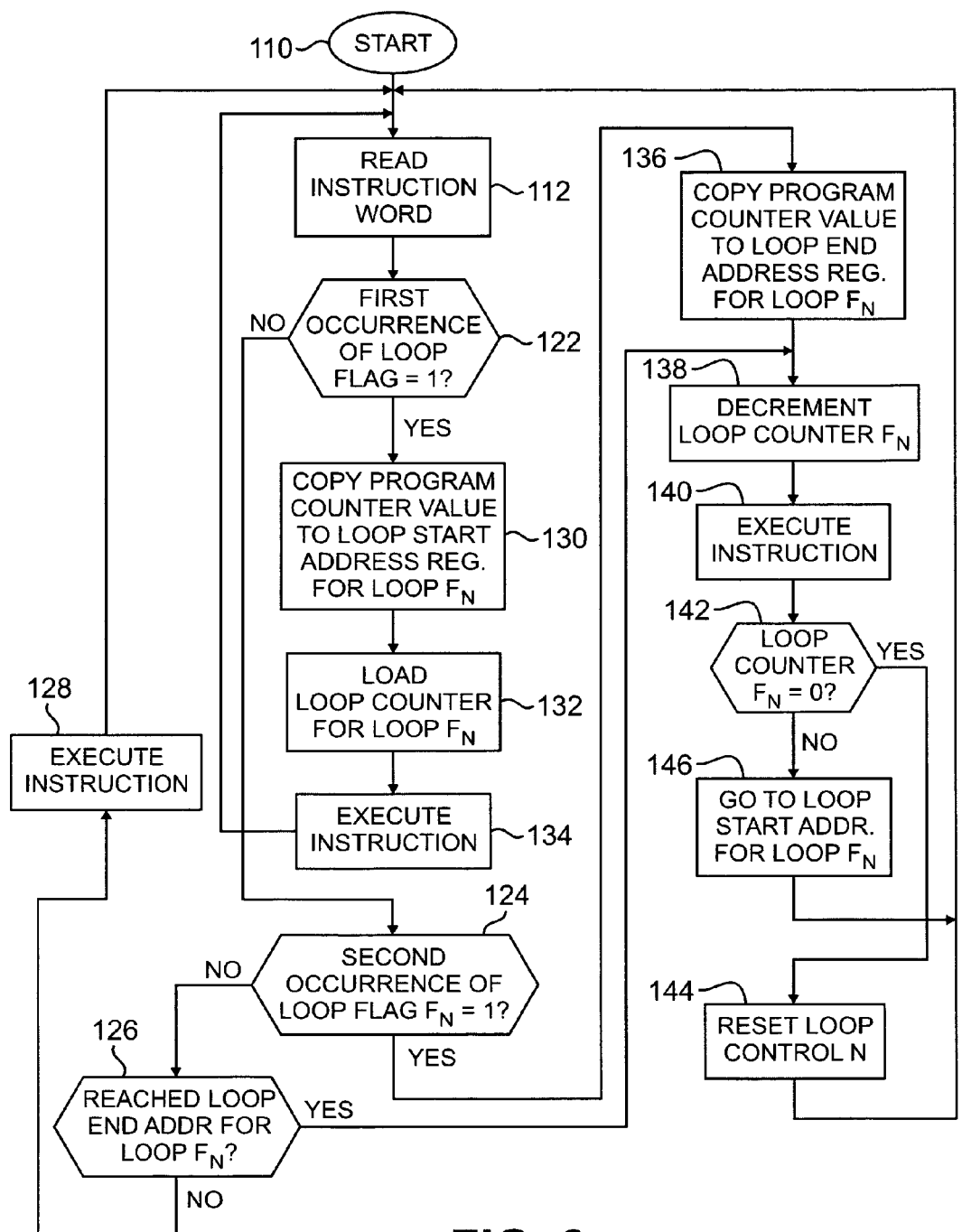
FIG. 6 is a simplified flowchart of an embodiment of a nested loop control method.

FIG. 6 is a simplified flowchart of an embodiment of a nested loop control method 110. In step 112, the instruction word stored in memory 32 pointed to by program counter 34 is read into instruction register 36. In step 122, a determination is made as to whether a first occurrence of a loop flag, $F_N$, where N=n-1, n-2, . . . 0, of the current instruction word indicates the beginning of a program loop. Referring also to FIG. 7, an instruction word 114 comprises a plurality of loop flags 116-120, where each loop flag is used to indicate the beginning and end instructions of a program loop. The first occurrence of a loop flag, $F_{n-1}$, for example, being set to a "1" indicates the beginning instruction of a program loop, and the second occurrence of the $F_{n-1}$ loop flag being set to a "1" indicates the end instruction of the same program loop. The loop flag bits are set to "0" if the instructions are not program loop beginning and end instructions.

If loop flag $F_N$ is not a "1," as determined in step 122, then a determination is made as to whether the it is a second occurrence of the loop flag in step 124. If it is not the second occurrence of the loop flag, then a determination is made in step 126 as to whether the loop end address has been reached for the program loop. The loop end address is stored in an end address register associated with the loop flag. If the loop end address has not been reached, then the instruction is simply executed in step 128 and the execution proceeds to step 112 to fetch and read the next instruction.

If, however, in step 122 it is determined that the loop flag $F_N$ is a "1" and it is the first occurrence of the loop flag, then in step 130, the program counter value, which points to the beginning of the current instruction, is copied to a start address register associated with loop flag that is set to "1." In step 132, a loop counter associated with loop flag $F_N$ is loaded an iteration value. The iteration may be provide by the processor host, for example. In a context-based reconfigurable processor configured to perform Viterbi decoding operations, for example, the loop counter is loaded with a Viterbi block size. In step 134, the current instruction is executed. The execution then proceeds to step 112 to fetch and read the next instruction word.

If in step 124, a determination is made that the loop flag $F_N$ is a "1" and it is the second occurrence of the loop flag, then this marks the end of the program loop associated with loop flag, $F_N$. In step 136, the program counter value is copied to an end address register associated with loop flag $F_N$. The value of the loop counter associated with loop flag $F_N$ is then decremented by one in step 138 since one iteration of the loop has been executed. The current instruction is then executed in step 140. In step 142, the value of the loop counter associated with loop flag $F_N$ is examined to determine if it has reached zero. If the loop counter value is zero, then all iterations of the loop execution has been performed and the loop control logic associated with loop flag $F_N$ is reset to the initial state in step 144 and then the execution proceeds to step 112.

If the loop counter has not yet reached zero, then the program counter is loaded with the loop start address from the start address register associated with the loop flag $F_N$ in step 146. The execution then proceeds to step 112 to fetch the instruction at the beginning the program loop. The instructions including and between the beginning and end instructions of the program loop are thus executed until they have been executed for the correct numbers of iterations.

Accordingly, the beginning of a program loop is indicated by an instruction word with one of the loop flags set to "1," and the end of same program loop is indicated by an instruction word with the same loop flag also set to "1." In this way, the loops may be nested inside one another. Each loop flag has, associated therewith, a loop counter to keep track of the number of times the loop is to be executed, a start address register to store the loop starting address, and an end address register to store the loop ending address.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A loop control system comprising:
   an instruction register operable to store an instruction word comprising a plurality of loop flags, each loop flag consisting of one bit, each loop flag associated with a different one of a plurality of nested program loops;
   a loop counter associated with each loop flag and operable to store and compute a number of times a program loop is to be executed, wherein each loop counter is further configured to store a Viterbi block size used during a Viterbi decoding operation that represents the number of times the program loop is to be executed;
   a start address register associated with each loop flag and operable to store a program loop starting address when the associated loop flag indicates a loop beginning, and wherein the program loop starting address comprises an address of an instruction word; and
   an end address register associated with each loop flag and operable to store a program loop ending address when the associated loop flag indicates a loop ending, and wherein the program loop ending address comprises the address of an instruction word, wherein each loop flag in the instruction word is assigned a first value when the instruction word is a beginning instruction or end instruction of the program loop associated with the loop flag and is assigned a second value when the instruction word is a middle instruction of the program loop associated with the loop flag.

2. The system of claim 1 wherein the each loop flag is assigned a value of '1' when the instruction word is the beginning instruction or end instruction of the program loop associated with the loop flag and is assigned a value of '0' when the instruction word is a middle instruction of the program loop associated with the loop flag.

3. A loop control method comprising:
   reading a plurality of instructions, each instruction comprising a plurality of loop flags, each loop flag consisting of one bit, each loop flag associated with a different one of a plurality of nested program loops;
   determining for each of the instructions whether one of the loop flags indicates one of a beginning of a program loop and an ending of a program loop;
   storing an address of a first instruction in a start address register in response to the one loop flag in the first instruction indicating the beginning of a program loop;
   setting a loop counter to a predetermined iteration number, wherein the loop counter is further configured to store a Viterbi block size used during a Viterbi decoding operation that represents the number of times the program loop is to be executed;
   reading and executing instructions in the program loop until a loop flag in a second instruction corresponding to the one loop flag in the first instruction indicates the ending of the program loop;
   storing an address of the second instruction in an end address register in response to the loop flag in the second instruction indicating the ending of the program loop; and repeatedly executing instructions between the addresses stored in the start and end address registers for the number of iterations stored in the loop counter,
wherein each loop flag in each instruction is assigned a first value when the instruction is a beginning instruction or end instruction of the program loop associated with the loop flag and is assigned a second value when the instruction is a middle instruction of the program loop associated with the loop flag.

4. The method of claim 3, wherein determining whether one of the loop flags indicates the beginning or the ending of a program loop comprises determining whether a particular loop flag is set.

5. The method of claim 4, wherein storing an address of the first instruction in a start address register comprises storing the address in a particular start address register associated with the particular loop flag.

6. The method of claim 4, wherein setting a loop counter comprises setting a loop counter associated with the particular loop flag.

7. The method of claim 4, wherein storing an address of the second instruction in an end address register comprises storing the address in a particular end address register associated with the particular loop flag.

8. The method of claim 3, wherein determining whether one of the loop flags indicates the beginning of a program loop comprises determining whether a predetermined bit in the first instruction is set to "1".

9. The method of claim 8, wherein reading and executing instructions in the program loop until the loop flag in the second instruction indicates the ending of the program loop comprises reading and executing instructions in the program loop until the predetermined bit in the second instruction is set to "1".

10. The method of claim 3, further comprising decrementing the loop counter each time an instruction at the address stored in the end address register is executed.

11. A reconfigurable processor system comprising:
an interconnect fabric; and
a plurality of context-based reconfigurable processors coupled to the interconnect fabric, wherein the plurality of context-based reconfigurable processors are configured to operate as the master of the interconnect fabric and configured to perform a particular signal processing task, and the plurality of context-based reconfigurable processors are further configured to be independently inactivated when not in use, each context-based reconfigurable processor comprising:
an instruction register operable to store an instruction word comprising a plurality of loop flags, each loop flag consisting of one bit, each loop flag associated with a different one of a plurality of nested program loops;
a loop counter associated with each loop flag and operable to store and compute a number of times a program loop is to be executed;
a start address register associated with each loop flag and operable to store a program loop starting address when the associated loop flag indicates a loop beginning, and wherein the program loop starting address comprises an address of the instruction word; and
an end address register associated with each loop flag and operable to store a program loop ending address when the associated loop flag indicates a loop ending, and wherein the program loop ending address comprises the address of the instruction word, wherein each loop flag in the instruction word is assigned a first value when the instruction word is a beginning instruction or end instruction of the program loop associated with the loop flag and is assigned a second value when the instruction word is a middle instruction of the program loop associated with the loop flag.

12. The system of claim 11, wherein the each loop flag is assigned a value of '1' when the instruction word is the beginning instruction or end instruction of the program loop associated with the loop flag and is assigned a value of '0' when the instruction word is a middle instruction of the program loop associated with the loop flag.

13. The system of claim 11, further comprising a real-time sequencer coupled to the interconnect fabric and operable to schedule and control the plurality of context-based reconfigurable processors.

14. The system of claim 11, wherein a context-based reconfigurable processor is operable to perform Viterbi decoding operations.

15. A wireless communication device comprising:
a broadband modem comprising:
an interconnect fabric; and
a plurality of context-based reconfigurable processors coupled to the interconnect fabric wherein the plurality of context-based reconfigurable processors are configured to operate as the master of the interconnect fabric and configured to perform a particular signal processing task, and the plurality of context-based reconfigurable processors are further configured to be independently inactivated when not in use, each context-based reconfigurable processor comprising:
an instruction register operable to store an instruction word comprising a plurality of loop flags, each loop flag consisting of one bit, each loop flag associated with a different one of a plurality of nested program loops;
a loop counter associated with each loop flag and operable to store and compute a number of times a program loop is to be executed;
a start address register associated with each loop flag and operable to store a program loop starting address when the associated loop flag indicates a loop beginning, and wherein the program loop starting address comprises an address of the instruction word; and
an end address register associated with each loop flag and operable to store a program loop ending address when the associated loop flag indicates a loop ending, and wherein the program loop ending address comprises the address of the instruction word, wherein each loop flag in the instruction word is assigned a first value when the instruction word is a beginning instruction or end instruction of the program loop associated with the loop flag and is assigned a second value when the instruction word is a middle instruction of the program loop associated with the loop flag.

16. The wireless communication device of claim 15, wherein the each loop flag is assigned a value of '1' when the instruction word is the beginning instruction or end instruction of the program loop associated with the loop flag and is assigned a value of '0' when the instruction word is a middle instruction of the program loop associated with the loop flag.

17. The wireless communication device of claim 15, further comprising a real-time sequencer coupled to the interconnect fabric and operable to schedule and control the plurality of context-based reconfigurable processors.

18. The wireless communication device of claim 15, wherein a context-based reconfigurable processor is operable to perform Viterbi decoding operations.

19. The wireless communication device of claim 15, further comprising an RF section coupled to the broadband modem.

20. The method of claim 3, wherein determining whether one of the loop flags indicates the beginning of a program loop comprises determining whether a predetermined bit in the first instruction is set to "0".

* * * * *